US009544866B2

(12) United States Patent
Rekimoto

(10) Patent No.: US 9,544,866 B2
(45) Date of Patent: *Jan. 10, 2017

(54) POSITION ESTIMATION OF A WIRELESS TERMINAL IN A STRUCTURE USING BASE STATION SIGNAL INFORMATION

(71) Applicant: Sony Corporation, Tokyo (JP)

(72) Inventor: Junichi Rekimoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/540,641

(22) Filed: Nov. 13, 2014

(65) Prior Publication Data
US 2015/0057032 A1 Feb. 26, 2015

Related U.S. Application Data

(63) Continuation of application No. 14/183,944, filed on Feb. 19, 2014, now Pat. No. 8,903,421, which is a (Continued)

(30) Foreign Application Priority Data

Apr. 18, 2008 (JP) ................................. 2008-109225

(51) Int. Cl.
H04W 64/00 (2009.01)
G01S 5/00 (2006.01)
(Continued)

(52) U.S. Cl.
CPC ............ *H04W 64/00* (2013.01); *G01S 5/0018* (2013.01); *G01S 5/0252* (2013.01); *H04W 4/043* (2013.01);
(Continued)

(58) Field of Classification Search
CPC ....... H04W 24/00; H04W 24/10; H04W 64/00
(Continued)

(56) References Cited

U.S. PATENT DOCUMENTS 7,272,394 B2 9/2007 Krishnakumar et al.
7,426,197 B2 9/2008 Schotten et al.
(Continued)

FOREIGN PATENT DOCUMENTS

CN 1575017 2/2005
EP 1 111 951 A2 6/2001
(Continued)

OTHER PUBLICATIONS

Supplementary European Search Report issued Mar. 29, 2011, in The Hague, in corresponding EP 09 73 3101.

*Primary Examiner* — Kamran Afshar
*Assistant Examiner* — Farideh Madani
(74) *Attorney, Agent, or Firm* — Oblon, McClelland, Maier & Neustadt, L.L.P.

(57) ABSTRACT

A wireless terminal, method, and non-transitory computer-readable storage medium. The wireless terminal includes circuitry configured to receive a wireless signal transmitted from a base station; perform signal intensity measurement of the received wireless signal; receive, via a graphical user interface, section information that identifies a section of a building structure for which the signal intensity measurement is to be performed; and transmit measurement information acquired by the signal intensity measurement of the received wireless signal, base station identification information that indicates a base station of a transmission source of the wireless signal, and the section information. The measurement information is associated with the base station identification information and the section information. The circuitry is further configured to perform the signal intensity measurement of the received wireless signal in response to a predetermined user input operation that is received after the section information.

18 Claims, 12 Drawing Sheets

Related U.S. Application Data continuation of application No. 13/405,974, filed on Feb. 27, 2012, now Pat. No. 8,700,058, which is a continuation of application No. 12/936,135, filed as application No. PCT/JP2009/057105 on Apr. 7, 2009, now Pat. No. 8,229,465.

(51) Int. Cl.

| | | |
|---|---|---|
| *G01S 5/02* | (2010.01) | |
| *H04W 24/10* | (2009.01) | |
| *H04W 24/08* | (2009.01) | |
| *H04W 60/00* | (2009.01) | |
| *H04W 4/04* | (2009.01) | |

(52) U.S. Cl.
CPC ............. *H04W 24/08* (2013.01); *H04W 24/10* (2013.01); *H04W 60/00* (2013.01); *H04W 4/04* (2013.01)

(58) Field of Classification Search
USPC ....... 455/456.1–457; 340/539.2, 539.13, 525
See application file for complete search history.

(56) References Cited

U.S. PATENT DOCUMENTS

| | | | |
|---|---|---|---|
| 7,457,262 B1 | 11/2008 | Doshi et al. | |
| 8,700,058 B2* | 4/2014 | Rekimoto ............ | G01S 5/0018 455/456.1 |
| 2003/0022676 A1 | 1/2003 | Nakamoto et al. | |
| 2003/0222819 A1 | 12/2003 | Karr et al. | |
| 2004/0061646 A1 | 4/2004 | Andrews et al. | |
| 2004/0172277 A1 | 9/2004 | Dione | |
| 2004/0246926 A1 | 12/2004 | Belcea et al. | |
| 2004/0258012 A1 | 12/2004 | Ishii | |
| 2006/0023681 A1 | 2/2006 | A'Rafat | |
| 2006/0046709 A1* | 3/2006 | Krumm ............... | H04N 21/4126 455/422.1 |
| 2006/0087425 A1 | 4/2006 | Haeberlen et al. | |
| 2006/0089153 A1 | 4/2006 | Sheynblat | |
| 2006/0095349 A1 | 5/2006 | Morgan et al. | |
| 2006/0135183 A1* | 6/2006 | Zavada ................ | G01C 21/206 455/457 |
| 2006/0293064 A1 | 12/2006 | Robertson et al. | |
| 2007/0049286 A1* | 3/2007 | Kim ...................... | G01S 5/0252 455/456.1 |
| 2008/0032705 A1 | 2/2008 | Patel et al. | |
| 2008/0070572 A1 | 3/2008 | Shkedi | |
| 2008/0259199 A1 | 10/2008 | Sako et al. | |

FOREIGN PATENT DOCUMENTS

| | | |
|---|---|---|
| EP | 1 480 483 A2 | 11/2004 |
| JP | 07-231473 | 8/1995 |
| JP | 2002-223218 | 8/2002 |
| JP | 2004-350088 | 12/2004 |
| JP | 2005-229617 | 8/2005 |
| JP | 2007-43574 | 2/2007 |
| JP | 2007-150435 | 6/2007 |

\* cited by examiner

| BASE STATION ID | SIGNAL INTENSITY |
|---|---|
| 30C | -67dBm |
| 30D | -57dBm |
| 30E | -74dBm |
| 30F | -66dBm |
| 30G | -80dBm |

FIG. 7A

| BASE STATION ID | SIGNAL INTENSITY | FLOOR INFORMATION |
|---|---|---|
| 30C | -67dBm | KK BUILDING 4TH FLOOR |
| 30D | -57dBm | |
| 30E | -74dBm | |
| 30F | -66dBm | |
| 30G | -80dBm | |

FIG. 7B

| BASE STATION ID | SIGNAL INTENSITY | FLOOR INFORMATION |
|---|---|---|
| 30C | −80dBm | KK BUILDING 5TH FLOOR |
| 30D | −68dBm | |
| 30E | −65dBm | |
| 30F | −57dBm | |
| 30G | −68dBm | |

FIG. 7C

| BASE STATION ID | SIGNAL INTENSITY | FLOOR INFORMATION |
|---|---|---|
| 30C | -68dBm | KK BUILDING 4TH FLOOR |
| 30D | -60dBm | |
| 30E | -67dBm | |
| 30F | -70dBm | |
| 30G | -80dBm | |

FIG. 7D

| BASE STATION ID | SIGNAL INTENSITY | FLOOR INFORMATION |
|---|---|---|
| 30A | -82dBm | KK BUILDING 3RD FLOOR |
| 30B | -65dBm | |
| 30C | -63dBm | |
| 30D | -70dBm | |
| 30E | -79dBm | |

FIG. 8

| BASE STATION ID | ESTIMATED DISTANCE | FLOOR INFORMATION |
|---|---|---|
| 30A | 100m | 3RD FLOOR |
| 30B | 21m | 3RD FLOOR |
| 30C | 25m | 4TH FLOOR |
| | 83m | 5TH FLOOR |
| | 28m | 4TH FLOOR |
| | 17m | 3RD FLOOR |
| 30D | 10m | 4TH FLOOR |
| | 28m | 5TH FLOOR |
| | 13m | 4TH FLOOR |
| | 33m | 3RD FLOOR |
| 30E | 48m | 4TH FLOOR |
| | 21m | 5TH FLOOR |
| | 25m | 4TH FLOOR |
| | 76m | 3RD FLOOR |
| 30F | 22m | 4TH FLOOR |
| | 10m | 5TH FLOOR |
| | 33m | 4TH FLOOR |
| 30G | 83m | 4TH FLOOR |
| | 28m | 5TH FLOOR |
| | 83m | 4TH FLOOR |

| BASE STATION ID | ESTIMATED DISTANCE |
|---|---|
| 30C | 3m |
| 30D | 19m |
| 30E | 17m |
| 30F | 33m |
| 30G | 76m |

FIG. 11

| d(30i) | d(30i,Pj) | D(30i,Pj) |
|---|---|---|
| 30m d(30C) | 25m d(30C,P1) | 55m D(30C,P1) |
| | 83m d(30C,P2) | 113m D(30C,P2) |
| | 28m d(30C,P3) | 58m D(30C,P3) |
| | 17m d(30C,P4) | 47m D(30C,P4) |
| 19m d(30D) | 10m d(30D,P1) | 29m D(30D,P1) |
| | 28m d(30D,P2) | 47m D(30D,P2) |
| | 13m d(30D,P3) | 32m D(30D,P3) |
| | 33m d(30D,P4) | 52m D(30D,P4) |
| 17m d(30E) | 48m d(30E,P1) | 65m D(30E,P1) |
| | 21m d(30E,P2) | 38m D(30E,P2) |
| | 25m d(30E,P3) | 42m D(30E,P3) |
| | 76m d(30E,P4) | 93m D(30E,P4) |
| 30m d(30F) | 22m d(30F,P1) | 55m D(30F,P1) |
| | 10m d(30F,P2) | 43m D(30F,P2) |
| | 33m d(30F,P3) | 66m D(30F,P3) |
| 76m d(30G) | 83m d(30G,P1) | 159m D(30G,P1) |
| | 28m d(30G,P2) | 104m D(30G,P2) |
| | 83m d(30G,P3) | 159m D(30G,P3) |

POSITION ESTIMATION OF A WIRELESS TERMINAL IN A STRUCTURE USING BASE STATION SIGNAL INFORMATION

CROSS-REFERENCE TO RELATED APPLICATIONS

This application is a continuation of application Ser. No. 14/183,944, filed Feb. 19, 2014, which is continuation of application Ser. No. 13/405,974 filed Feb. 27, 2012, now U.S. Pat. No. 8,700,058, which is a continuation of application Ser. No. 12/936,135 filed Nov. 12, 2010, now U.S. Pat. No. 8,229,465, which is a National Phase application based on PCT/JP2009/057105 filed Apr. 7, 2009, and published as WO 2009/128364, which claims the benefit of priority of Japanese Application No. 2008-109225, filed Apr. 18, 2008, all of which are incorporated herein by reference.

TECHNICAL FIELD

The present invention relates to an information processing device, a program, an information processing method and an information processing system.

BACKGROUND ART

Recently, a receiving device that can receive a wireless signal transmitted from a satellite is equipped on a movable body, such as a vehicle, a mobile phone and the like. Global positioning system (GPS) positioning enables estimation of the position of the movable body equipped with this type of receiving device. A position estimation technology that uses this type of receiving device is a common basic technology that is important in a variety of fields including navigation, security, entertainment and the like.

Further, a position estimation method is also conceivable in which a wireless terminal that performs wireless communication with a base station (an access point) of a wireless local area network (LAN) measures a signal intensity of a signal transmitted from the wireless base station, and a position estimation device that can communicate with the wireless terminal estimates the position of the wireless terminal based on the signal intensity. For example, the wireless LAN base station transmits a beacon at a constant frequency (for example, five times per second) to notify a surrounding area of the existence of the wireless LAN base station. The wireless terminal transmits the signal intensity of the beacon to the position estimation device. The position estimation device can estimate the position of the wireless terminal based on the signal intensity and the position of the wireless LAN base station that is registered in advance. With the above-described position estimation method, the wireless LAN base station is provided also in indoor or underground environments. Therefore, it is possible to perform position estimation in indoor or underground environments, which is difficult using the position estimation technology based on the GPS positioning.

In this type of position estimation method, when a user carrying a wireless terminal is present in a building or structure, not only the latitude and longitude of the wireless terminal, but also information indicating which floor of the building or structure the user is currently on is important. For example, Patent Document 1 discloses a technology in which a wireless terminal measures signal intensities of wireless signals transmitted from a plurality of base stations, and a position estimation server estimates that the wireless terminal exists on the floor of a base station that is a transmission source of a wireless signal with a strong signal intensity.

CITATION LIST

Patent Literature

Patent Literature 1: JP 2005-229617 (A)

SUMMARY OF INVENTION

Technical Problem

However, the known position estimation technology simply estimates, based on the current signal intensity, the floor on which the wireless terminal exists. Therefore, it is necessary to accurately register, in the position estimation server, the floor on which each of the base stations exists.

The present invention is made in view of the above-mentioned issue, and aims to provide an information processing device, a program, an information processing method and an information processing system which are novel and improved, and which are capable of estimating a position of a wireless terminal in a building or structure even when a position of each base station in the building or structure is not accurately registered in advance.

Solution to Problem

According to the first aspect of the present invention in order to achieve the above-mentioned object, there is provided an information processing device including: a storage portion that associates and stores section information indicating one section of a building structure, first measurement information acquired by signal intensity measurement of a wireless signal transmitted from a surrounding base station in a wireless terminal existing in the one section, and base station identification information that identifies the base station; a receiving portion that receives, from a given wireless terminal, at least one piece of second measurement information acquired by signal intensity measurement of a wireless signal in the given wireless terminal, and at least one piece of base station identification information that indicates a base station of a transmission source of the wireless signal received by the given wireless terminal and that is associated with each of the at least one piece of second measurement information; a retrieval portion that retrieves, from the storage portion, at least one piece of first measurement information that is associated with the at least one piece of base station identification information received by the receiving portion; a selection portion that selects section information that is associated with one of the at least one piece of first measurement information, based on the at least one piece of second measurement information received by the receiving portion and the at least one piece of first measurement information retrieved by the retrieval portion; and a transmitting portion that transmits, to the given wireless terminal, the section information selected by the selection portion.

The information processing device may further include an evaluation portion that evaluates an acquisition position relationship between the at least one piece of first measurement information and the at least one piece of second measurement information, based on the at least one piece of first measurement information retrieved by the retrieval portion, and on second measurement information that is associated with the same base station identification information as the at least one piece of first measurement information, among the at least one piece of second measurement information received by the receiving portion. The selection portion may select, based on an evaluation result by the evaluation portion, section information associated with first measurement information that forms a pair with second measurement information such that the acquisition position relationship between the first measurement information and the second measurement information is relatively good.

For each of the at least one piece of first measurement information retrieved by the retrieval portion, the evaluation portion may calculate, based on the first measurement information, a first distance between an acquisition position of the first measurement information and a base station corresponding to the first measurement information. For each of the at least one piece of second measurement information received by the receiving portion, the evaluation portion may calculate, based on the second measurement information, a second distance between an acquisition position of the second measurement information and a base station corresponding to the second measurement information. The evaluation portion may add the first distance and the second distance that are calculated based on the first measurement information and the second measurement information that are associated with the same base station identification information. The selection portion may select section information that corresponds to the first distance that has a minimum sum value when the second distance obtained by the evaluation portion is added thereto.

When the retrieval portion retrieves a plurality of pieces of first measurement information that are associated with the same base station identification information and the same section information, the evaluation portion may compute an average value of sum values of the first distances and the second distance calculated based on the plurality of pieces of first measurement information associated with the same base station identification information and the same section information and on the second measurement information. The selection portion may select section information that corresponds to a piece of the first measurement information that is computed by the evaluation portion and that has a smallest average value or a smallest sum value.

The information processing device may further include a priority processing portion that performs processing such that, as the number of pieces of section information associated with the same base station identification information is larger, the section information is selected with priority by the selection portion.

According to the second aspect of the present invention in order to achieve the above-mentioned object, there is provided a program that causes a computer to function as: a receiving portion that receives, from a given wireless terminal, at least one piece of second measurement information acquired by signal intensity measurement of a wireless signal in the given wireless terminal, and at least one piece of base station identification information that indicates a base station of a transmission source of the wireless signal received by the given wireless terminal and that is associated with each of the at least one piece of second measurement information; a retrieval portion that, from a storage medium that associates and stores section information indicating one section of a building structure, first measurement information acquired by signal intensity measurement of a wireless signal transmitted from a surrounding base station in a wireless terminal existing in the one section, and base station identification information that identifies the base station, retrieves at least one piece of first measurement information that is associated with the at least one piece of base station identification information received by the receiving portion; a selection portion that selects section information that is associated with one of the at least one piece of first measurement information, based on the at least one piece of second measurement information received by the receiving portion and the at least one piece of first measurement information retrieved by the retrieval portion; and a transmitting portion that transmits, to the given wireless terminal, the section information selected by the selection portion.

According to the third aspect of the present invention in order to achieve the above-mentioned object, there is provided an information processing method, including the steps of: receiving, from a given wireless terminal, at least one piece of second measurement information acquired by signal intensity measurement of a wireless signal in the given wireless terminal, and at least one piece of base station identification information that indicates a base station of a transmission source of the wireless signal received by the given wireless terminal and that is associated with each of the at least one piece of second measurement information; retrieving, from a storage medium that associates and stores section information indicating one section of a building structure, first measurement information acquired by signal intensity measurement of a wireless signal transmitted from a surrounding base station in a wireless terminal existing in the one section, and base station identification information that identifies the base station, at least one piece of first measurement information that is associated with the at least one piece of base station identification information received in the receiving step; selecting section information that is associated with one of the at least one piece of first measurement information, based on the at least one piece of second measurement information received in the receiving step and the at least one piece of first measurement information retrieved in the retrieving step; and transmitting, to the given wireless terminal, the section information selected in the selecting step.

According to the fourth aspect of the present invention in order to achieve the above-mentioned object, there is provided an information processing system that includes a wireless terminal and an information processing device. The wireless terminal includes: a wireless signal receiving portion that receives a wireless signal transmitted from a base station; a measurement portion that performs signal intensity measurement of the wireless signal received by the wireless signal receiving portion; and an information transmitting portion that transmits at least one piece of second measurement information acquired by the signal intensity measurement of the wireless signal performed by the measurement portion, and at least one piece of base station identification information that indicates a base station of a transmission source of the wireless signal and that is associated with each of the at least one piece of second measurement information. The information processing device includes: a storage portion that associates and stores section information indicating one section of a building structure, first measurement information acquired by signal intensity measurement of a wireless signal transmitted from a surrounding base station in a given wireless terminal existing in the one section, and base station identification information that identifies the base station; a receiving portion that receives, from the information transmitting portion of the given wireless terminal, the at least one piece of second measurement information and the at least one piece of base station identification information; a retrieval portion that retrieves, from the storage portion, at least one piece of first measurement information that is associated with the at least one piece of base station identification information received by the receiving portion; a selection portion that selects section information that is associated with one of the at least one piece of first measurement information, based on the at least one piece of second measurement information received by the receiving portion and the at least one piece of first measurement information retrieved by the retrieval portion; and a transmitting portion that transmits, to the given wireless terminal, the section information selected by the selection portion.

According to the fifth aspect of the present invention in order to achieve the above-mentioned object, there is provided an information processing system that includes a wireless terminal and an information processing device. The wireless terminal includes: a wireless signal receiving portion that receives a wireless signal transmitted from a base station; a measurement portion that performs signal intensity measurement of the wireless signal received by the wireless signal receiving portion; an input portion to which section information indicating one section of a building structure is input by a user; and an information transmitting portion that transmits at least one piece of second measurement information acquired by the signal intensity measurement of the wireless signal performed by the measurement portion, and at least one piece of base station identification information that indicates a base station of a transmission source of the wireless signal and that is associated with each of the at least one piece of second measurement information. There is provided a receiving portion that receives, from the information transmitting portion of the wireless terminal, the at least one piece of second measurement information, the at least one piece of base station identification information, and the section information; a storage portion; and a recording portion that associates and records in the storage portion each of the at least one piece of second measurement information, the at least one piece of base station identification information associated with the second measurement information, and the section information that are received by the receiving portion.

Advantageous Effects of Invention

As described above, according to the information processing device, the program, the information processing method and the information processing system of the present invention, it is possible to estimate a position of a wireless terminal in a building or structure even when a position of each base station in the building or structure is not accurately registered in advance.

BRIEF DESCRIPTION OF DRAWINGS

FIG. 7A is an explanatory diagram showing a specific example of registration request information that is transmitted from the mobile terminal at the position P1.

FIG. 7B is an explanatory diagram showing a specific example of registration request information that is transmitted from the mobile terminal at a position P2.

FIG. 7C is an explanatory diagram showing a specific example of registration request information that is transmitted from the mobile terminal at a position P3.

FIG. 7D is an explanatory diagram showing a specific example of registration request information that is transmitted from the mobile terminal at a position P4.

FIG. 8 is an explanatory diagram showing a specific example of a set of base station information that is registered in a storage portion.

FIG. 11 is an explanatory diagram showing specific examples of distance evaluation by the distance evaluation portion.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Note that "embodiments to carry out the present invention" will be described in the following order.

[1] Overview of position estimation system according to present embodiment

[2] Detailed explanation of position estimation system according to present embodiment

[2-1] Hardware configuration of position estimation server

[2-2] Registration of floor information

[2-3] Estimation of floor information

[3] Operation of position estimation system according to present embodiment

[4] Conclusion

[1] Position Estimation System According to Present Embodiment

First, a position estimation system 1 according to a present embodiment will be briefly described with reference to FIG. 1 and FIG. 2.

Figure 1:
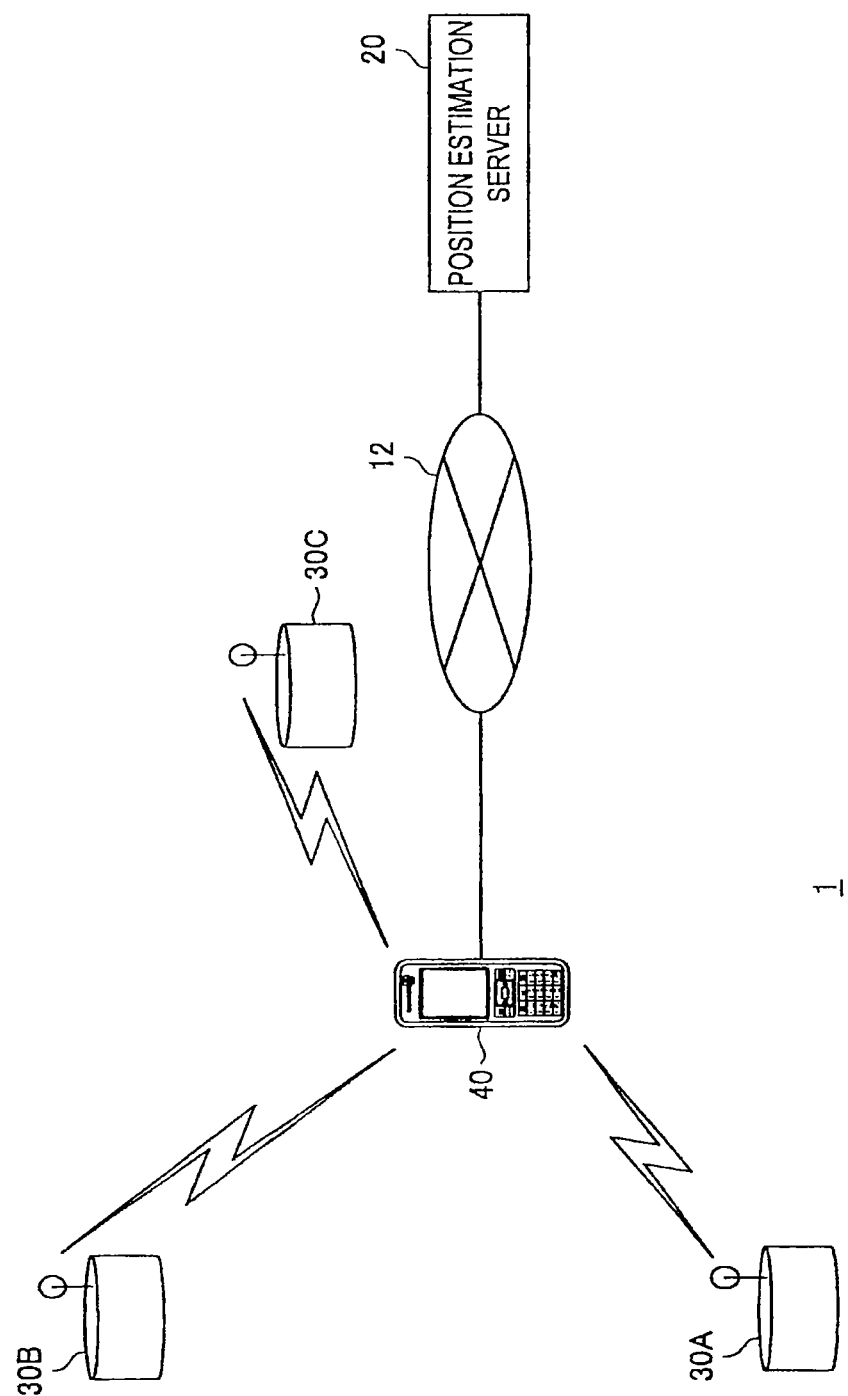
FIG. 1 is an explanatory diagram showing an example of a configuration of a position estimation system according to a present embodiment.

FIG. 1 is an explanatory diagram showing an example of a configuration of the position estimation system (information processing system) 1 according to the present embodiment. As shown in FIG. 1, the position estimation system 1 according to the present embodiment is provided with a communication network 12, a position estimation server 20, base stations 30A to 30C, and a wireless terminal 40. In FIG. 1, in order to distinguish each of the base stations, capital alphabetic characters are added after the numerals, for example, the base stations 30A, 30B. However, when there is no need to particularly distinguish each of the base stations, they are simply and collectively referred to as the base station(s) 30.

The base station 30 relays communication between communication devices that are spatially dispersed. For example, the base station 30 can relay wireless communication between the wireless terminal 40 and another wireless terminal (not shown in the figures) that are within a radio wave reachable range, and can also relay communication between the wireless terminal 40 and a communication device that is connected by wire to the base station 30. More specifically, the base station 30 may be a base station of a wireless local area network (LAN) based on the Wireless Fidelity (WiFi) standard, may be a base station of the Global System for Mobile Communications (GSM), or may be a base station of Bluetooth.

The base station 30 can periodically transmit a beacon signal to notify surroundings of the existence of the base station 30, in addition to a signal that is transmitted when the base station 30 relays wireless communication. The beacon signal includes a base station ID serving as base station identification information that is uniquely assigned to the base station 30, for example. As a result, based on the base station ID of the received beacon signal, the wireless terminal 40 can confirm the existence of the base station 30 that exists in the surrounding area.

The wireless terminal 40 can transmit and receive various types of data based on wireless communication controlled by the base station 30. For example, the wireless terminal 40 can receive content data from a content distribution server (not shown in the figures) via the base station 30, and can transmit and receive electronic mail to and from another wireless terminal (not shown in the figures). Note that the content data may include music data such as music, a lecture, a radio program, or the like, visual data such as a motion picture, a television program, a video program, a photograph, a painting, a diagram, or the like, and any other data, such as a game, software, or the like.

Note that, in FIG. 1, a mobile phone is illustrated as an example of the wireless terminal 40. However, the wireless terminal 40 is not limited to this example. For example, the wireless terminal 40 may also be a personal computer (PC), a home video processing device (a DVD recorder, a video deck, or the like), a Personal Handyphone System (PHS), a mobile music playback device, a mobile video processing device, a personal digital assistant (PDA), a home game console, a mobile game console, a household electrical appliance, or the like.

Further, when the wireless terminal 40 receives a wireless signal transmitted from the base station 30, the wireless terminal 40 measures a signal intensity of the wireless signal, and associates the measured signal intensity with the base station ID of the base station 30, thereby transmitting it as signal intensity information to the position estimation server 20 via the network 12. Note that the network 12 is a wired or wireless transmission channel of information transmitted from a device connected to the network 12. The network 12 may include, for example, the Internet, a telephone network, a public circuit such as a satellite communication network, any kind of local area network (LAN) including Ethernet (registered trademark), or a leased line network, such as a wide area network (WAN), or an internet protocol-virtual private network (IP-VPN).

The position estimation server 20 stores base station information including position information and the base station ID of each of the base stations 30, and has a function to estimate the position of the wireless terminal 40 using, for example, the triangulation principle, based on the signal intensity information received from the wireless terminal 40 and on the above-described base station information. The position estimation server 20 notifies the wireless terminal 40 of position information indicating the above-described estimated position. The wireless terminal 40 can thereby recognize the position information of the terminal itself. Note that the position estimation server 20 can respond to a position estimation request not only from the wireless terminal 40 but also from a plurality of other wireless terminals.

In this manner, according to the present embodiment, the wireless terminal 40 performs signal intensity measurement of the wireless signal transmitted from the surrounding base station 30, and transmits a measurement result to the position estimation server 20. Thus, it is possible to acquire the position information of the terminal itself.

Background of Present Embodiment

Here, the position information may be information indicating a two-dimensional position, such as the latitude and longitude, that does not include a height direction. Accordingly, the wireless terminal 40 existing in a certain building or structure can acquire, from the position estimation server 20, position information of the building or structure, or the name of the building or structure when the position information and the name of the building or structure are associated and stored in the position estimation server 20.

However, if not only the name of the building or structure in which the wireless terminal 40 exists, but also which section in the building or structure the wireless terminal 40 exists is ascertained by the wireless terminal 40, the wireless terminal 40 can provide a user with guidance in accordance with a floor, for example. Therefore, causing the wireless terminal 40 to ascertain floor information indicating the floor of the building or structure is practically important.

In order to acquire the floor information, a technology that uses GPS, for example, is conceivable. However, since it is difficult for a navigation message from a GPS satellite to reach indoor or underground locations, the use of the GPS in a building or structure is difficult. In addition, even if an altitude (above sea level) of a receiver can be measured by the GPS, it is necessary to ensure that:

(1) a relationship between the altitude and each floor of each building or structure is stored in a database; and (2) an estimated error of the altitude is sufficiently smaller than the height of each floor (for example, approximately 1 m).

To address this, in light of the foregoing circumstances, the position estimation system 1 according to the present embodiment has been created. With the position estimation system 1 according to the present embodiment, it is possible to estimate the position of the wireless terminal 40 in a building or structure, while simplifying a troublesome operation of pre-registration. Hereinafter, the position estimation system 1 according to the present embodiment will be described in detail.

[2] Detailed Explanation of Position Estimation System According to Present Embodiment The present embodiment is roughly classified into: a registration stage in which the position estimation server 20 registers the base station information including the floor information; and an estimation stage in which the position estimation server 20 estimates the floor information of the wireless terminal 40 based on the registered base station information. Therefore, in the description below, after explaining a hardware configuration of the position estimation server 20 included in the position estimation system 1 according to the present embodiment, the registration stage and the estimation stage of the floor information will be specifically explained.

[2-1] Hardware Configuration of Position Estimation Server

Figure 2:
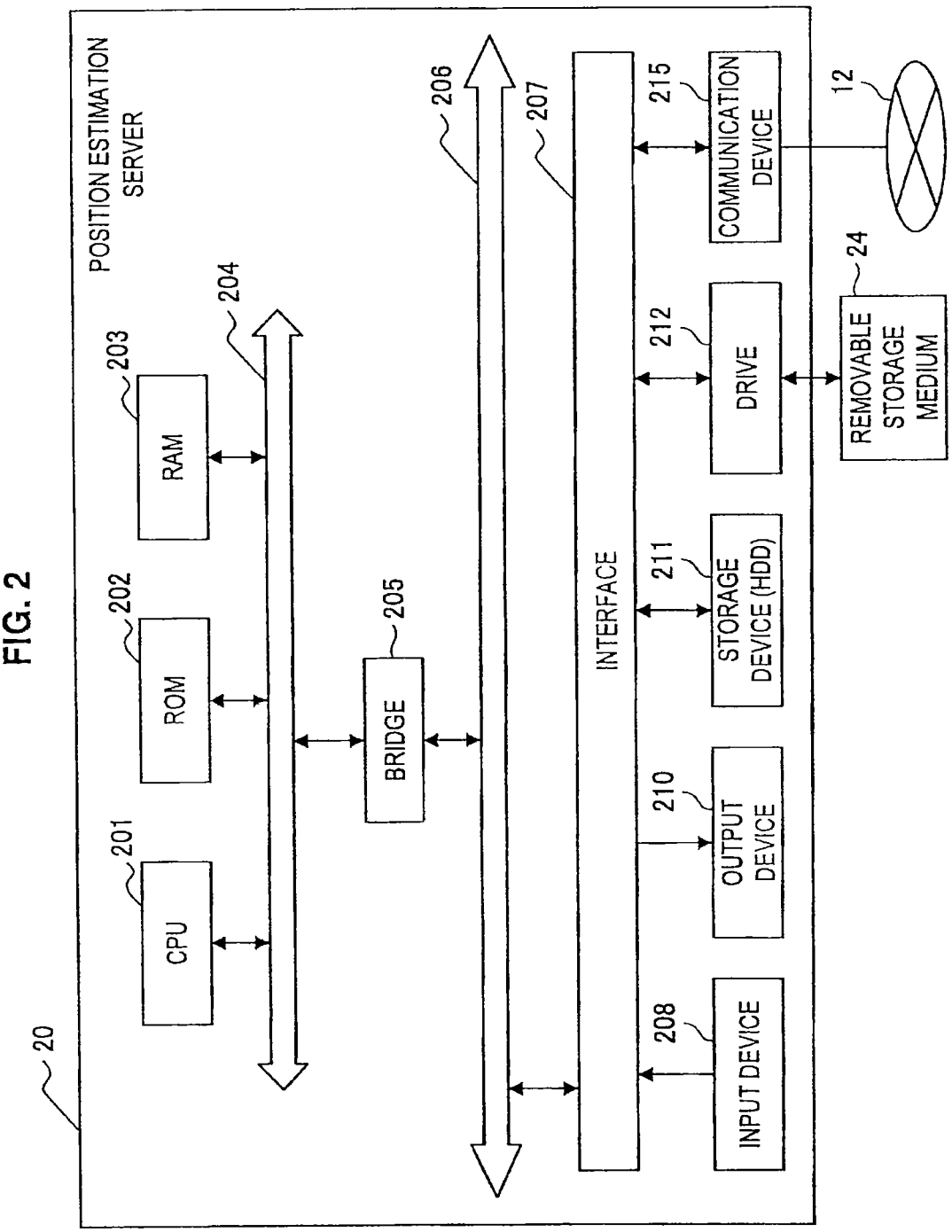
FIG. 2 is a block diagram showing a hardware configuration of a position estimation server.

FIG. 2 is a block diagram showing a hardware configuration of the position estimation server 20. The position estimation server 20 is provided with a central processing unit (CPU) 201, a read only memory (ROM) 202, a random access memory (RAM) 203, a host bus 204, a bridge 205, an external bus 206, an interface 207, an input device 208, an output device 210, a storage device (HDD) 211, a drive 212 and a communication device 215.

The CPU 201 functions as an arithmetic processing device and a control device, and controls an overall operation within the position estimation server 20 in accordance with various programs. Further, the CPU 201 may be a microprocessor. The ROM 202 stores programs, operation parameters and the like that are used by the CPU 201. The RAM 203 temporarily stores programs that are used in execution by the CPU 201, parameters that appropriately change in the execution, and the like. These are mutually connected by the host bus 204 that is formed of a CPU bus and the like.

The host bus 204 is connected, via the bridge 205, to the external bus 206, which is, for example, a peripheral component interconnect/interface (PCI) bus. Note that the host bus 204, the bridge 205 and the external bus 206 need not necessarily be formed separately, and these functions may be implemented on a single bus.

The input device 208 is formed by input means for inputting information by the user, an input control circuit and the like. Examples of the input means include a mouse, a keyboard, a touch panel, a button, a microphone, a switch, a lever and the like. The input control circuit generates an input signal based on input by the user, and outputs it to the CPU 201. By operating the input device 208, an administrator of the position estimation server 20 can input various types of data to the position estimation server 20 or give an instruction of a processing operation.

The output device 210 includes, for example, a display device such as a cathode ray tube (CRT) display device, a liquid crystal display (LCD) device, or an organic light emitting display (OLED) device and a lamp, and an audio output device such as a speaker and a headphone. The output device 210 outputs played back content, for example. More specifically, the display device displays, as text or images, various types of information such as played back video data. On the other hand, the audio output device converts the played back audio data etc. to audio and outputs it.

The storage device 211 is a device for storing data, and is structured as an example of a storage portion of the position estimation server 20 according to the present embodiment. The storage device 211 may include a storage medium, a recording device that records data in the storage medium, a read-out device that reads out data from the storage medium, a deletion device that deletes the data recorded in the storage medium, and the like. The storage device 211 is formed by a hard disk drive (HDD), for example. The storage device 211 drives a hard disk and stores programs executed by the CPU 201 and various types of data. Further, the base station information to be described later is recorded in the storage device 211.

The drive 212 is a reader/writer for the storage medium, and is incorporated in or externally attached to the position estimation server 20. The drive 212 reads out information recorded in an attached magnetic disk, optical disk or magneto optical disk, or in a removable storage medium 24 such as a semiconductor memory, and outputs the information to the RAM 203.

The communication device 215 is a communication interface that is formed by a communication device etc. to connect with the communication network 12, for example. Further, the communication device 215 may be a wireless local area network (LAN) compatible communication device, a wireless USB compatible communication device, or a wired communication device that performs communication by wire. The communication device 215 transmits and receives various types of information, such as signal intensity information, floor information, position information and the like, to and from the wireless terminal 40 via the communication network 12.

Note that the hardware configuration of the position estimation server 20 is described above with reference to FIG. 2. Hardware of the wireless terminal 40 can be configured to be substantially the same as that of the position estimation server 20, and an explanation thereof is therefore omitted.

[2-2] Registration of Floor Information

Next, registration of the floor information in the position estimation system 1 according to the present embodiment will be described with reference to FIG. 3 to FIG. 8.

Figure 3:
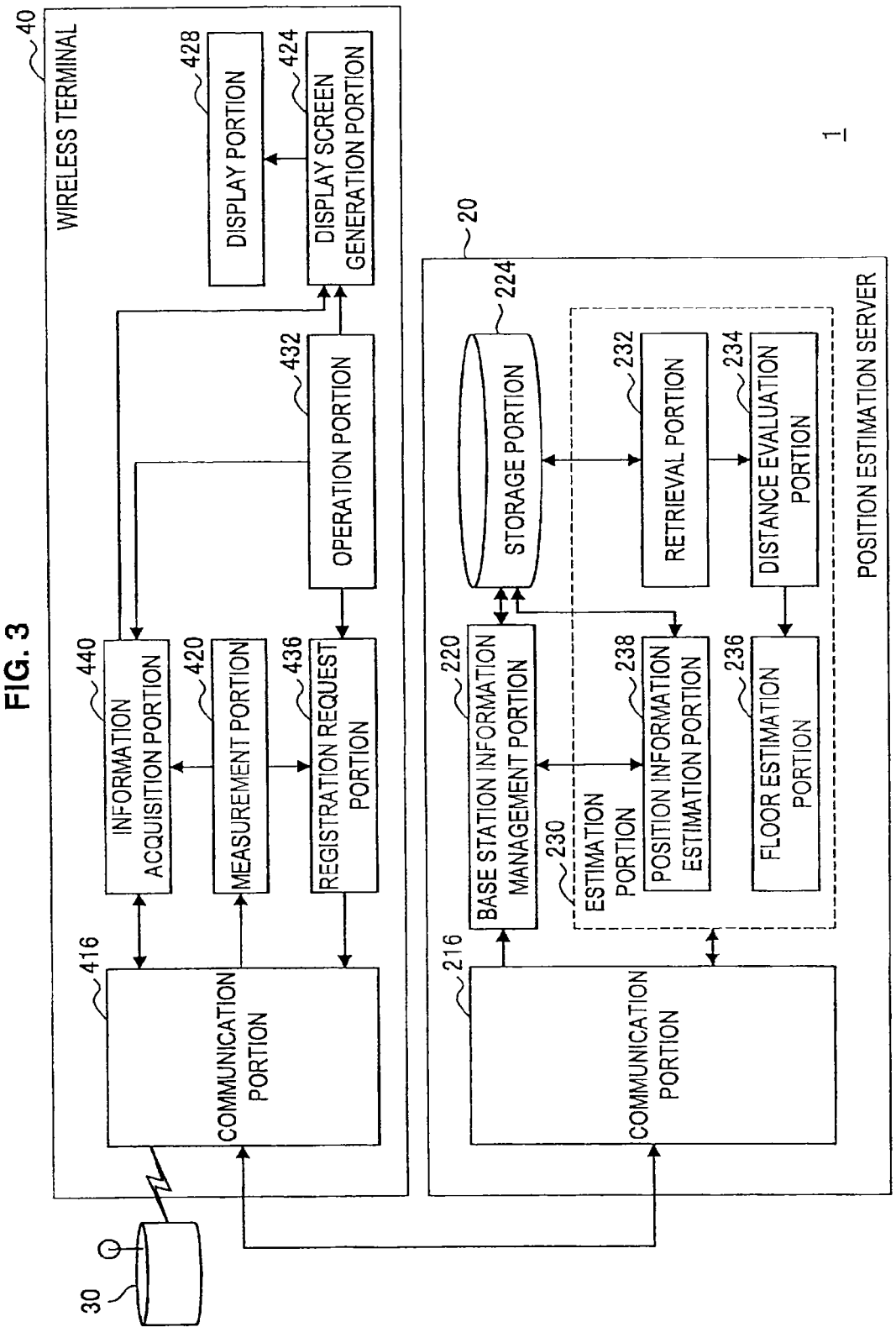
FIG. 3 is a function block diagram showing configurations of the position estimation server and a wireless terminal that are included in a position estimation system 1 according to the present embodiment.

FIG. 3 is a function block diagram showing the configurations of the position estimation server 20 and the wireless terminal 40 that are included in the position estimation system 1 according to the present embodiment. As shown in FIG. 3, the position estimation server 20 is provided with a communication portion 216, a base station information management portion 220, a storage portion 224, and a position information estimation portion 238 that includes a retrieval portion 232, a distance evaluation portion 234, a floor estimation portion 236 and a position information estimation portion 238. Further, the wireless terminal 40 is provided with a communication portion 416, a measurement portion 420, a display screen generation portion 424, a display portion 428, an operation portion 432, a registration request portion 436 and an information acquisition portion 440.

The communication portion 416 of the wireless terminal 40 is an interface with the base station 30 or the position estimation server 20, and has a function as a transmitting portion and a receiving portion for transmitting and receiving various types of information to and from the base station 30 or the position estimation server 20. For example, the communication portion 416 receives, from the base station 30, a wireless signal including the base station ID of the base station 30. Further, the communication portion 416 transmits, to the position estimation server 20, registration request information that will be described later.

Note that the communication portion 416 may have a wireless communication function that is defined by Institute of Electrical and Electronic Engineers (IEEE) 802.11a, b, g, and the like. Further, the communication portion 416 may have a multiple input multiple output (MIMO) communication function that is defined by IEEE 802.11n. Furthermore, the communication portion 416 may have a communication function that corresponds to Worldwide Interoperability for Microwave Access (WiMAX) planned by IEEE802.16.

The measurement portion 420 measures a signal intensity of a wireless signal received by the communication portion 416 from the base station 30. For example, the measurement portion 420 acquires signal intensity information shown in FIG. 5, by performing signal intensity measurement at a position P1 shown in FIG. 4.

Figure 4:
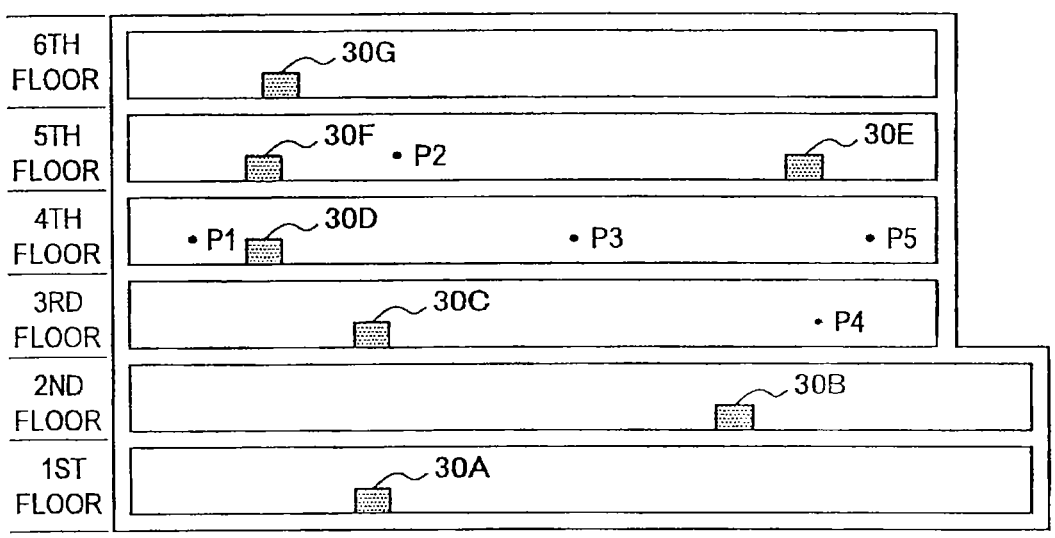
FIG. 4 is an explanatory diagram schematically showing a cross section of a certain building or structure.

FIG. 4 is an explanatory diagram schematically showing a cross section of a certain building or structure. More specifically, FIG. 4 shows the cross section of a 6-story building or structure, and the base station 30 is installed on each floor of the building or structure. For example, the base station 30A is installed on the 1st floor of the building or structure, the base station 30B is installed on the 2nd floor, the base station 30C is installed on the 3rd floor, the base station 30D is installed on the 4th floor, the base stations 30E and 30F are installed on the 5th floor, and the base station 30G is installed on the 6th floor, 2nd floor.

Figures 5, 6:
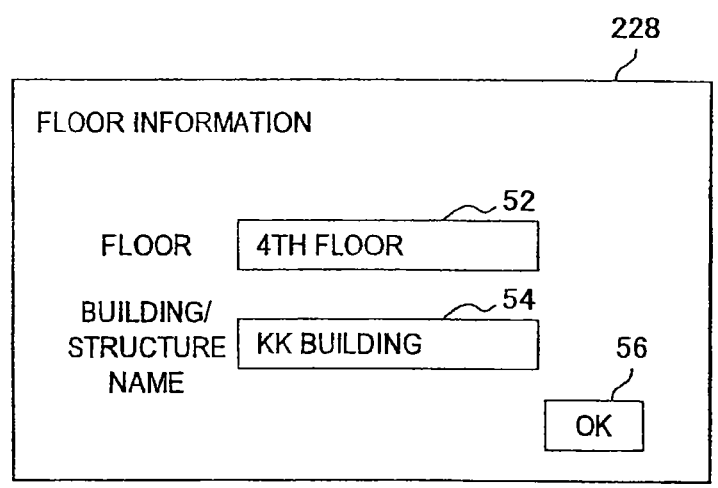
FIG. 5 is an explanatory diagram showing an example of signal intensity information that is acquired by signal intensity measurement at a position P1.
FIG. 6 is an explanatory diagram showing an example of a floor information registration screen that is generated by a display screen generation portion.

FIG. 5 is an explanatory diagram showing an example of signal intensity information that is acquired by signal intensity measurement at the position P1. Note that, in this specification, for convenience of explanation, the base station ID is the same as the reference numeral of each of the base stations 30. For example, in this specification, it is assumed that the base station ID of the base station 30A shown in FIG. 4 is 30A.

As shown in FIG. 4, the base station 30D is installed on the 4th floor that is the same floor as the position P1, and the base station 30C is installed on the 3rd floor that is the floor below the position P1. The base stations 30E and 30F are installed on the 5th floor that is the floor above the position P1, and the base station 30G is installed on the 6th floor. Here, the signal intensity of the wireless signal transmitted from each of the base stations 30 is attenuated as the distance becomes greater. Further, in a case where there is an obstacle, such as a wall, a floor or a ceiling, between the wireless terminal 40 and each of the base stations 30, the signal intensity of the wireless signal transmitted from each of the base stations 30 deteriorates because the wireless signal reaches the wireless terminal 40 after being diffracted by the obstacle or partially passing through the obstacle.

More specifically, as shown in FIG. 5, the signal intensity of the wireless signal transmitted from the base station 30D, which is installed on the 4th floor that is the same floor as the position P1 at which the wireless terminal 40 exists, is "−57 dBm," which is a highest value. Meanwhile, the signal intensity of the wireless signal transmitted from the base station 30C, which is provided via the floor with respect to the position P1 at which the wireless terminal 40 exists, is "−67 dBm", and the signal intensity is lower compared to the wireless signal transmitted from the base station 30D. In a similar manner, the signal intensities at the position P1 of the base stations 30E, 30F and 300, which are provided via an obstacle with respect to the position P1, are lower compared to the wireless signal transmitted from the base station 30D.

Here, the configuration of the wireless terminal 40 will be described again with reference to FIG. 3. The display screen generation portion 424 generates various types of display screens, and causes the display portion 428 to display the generated display screens. For example, the display screen generation portion 424 generates a floor information registration screen and a guidance screen etc. that corresponds to floor information acquired by the information acquisition portion 440. The display portion 428 corresponds to the output device 210, which has been explained with reference to FIG. 2, and displays the various types of display screens generated by the display screen generation portion 424. Hereinafter, a specific example of the floor information registration screen that is generated by the display screen generation portion 424 and is displayed on the display portion 428 will be described with reference to FIG. 6.

FIG. 6 is an explanatory diagram showing an example of the floor information registration screen that is generated by the display screen generation portion 424. The floor information registration screen is a screen to register, in the position estimation server 20, the floor information of each of the base stations 30 that is used at the time of floor estimation of the wireless terminal 40, and it is generated based on a user operation, for example.

More specifically, as shown in FIG. 6, the floor information registration screen includes a floor input area 52, a building/structure name input area 54, and an OK button 56. The floor input area 52 is an area to input the floor (level) on which the wireless terminal 40 currently exists. The user of the wireless terminal 40 can input the floor to the floor input area 52 by operating the operation portion 432. Note that, in FIG. 6, a case is assumed in which the user at the position P1 registers floor information. Therefore, an example is shown in which "4th floor" is input to the floor name input area 52.

The building/structure name input area 54 is an area to input the name of the building or structure in which the wireless terminal 40 currently exists. The user of the wireless terminal 40 can input the name of the building or structure to the building/structure name input area 54 by operating the operation portion 432. Note that, in FIG. 6, a case is shown in which "KK building" is input to the building/structure name input area 54. The OK button 56 is a button to confirm the content input to the floor input area 52 and the building/structure name input area 54.

Note that, in the above description, the floor information is used as an example of section information that indicates a section of the building or structure. However, the section information is not limited to this example. For example, the section information may be information that shows the name of a room (room 301, conference room, reception room or the like) that is defined by an obstacle, such as a wall, even if being on the same floor, or may be a user organization (SSS Co., Ltd., TT division, UUU store). Further, although the building is used as an example of the building or structure in the above description, the building or structure is not limited to this example. For example, the building or structure may be a subway station yard, an attraction facility (in this case, a haunted house, a cafeteria, a VVV area and the like are assumed as the section information), a Shinkansen train (in this case, a carriage number is assumed as the section information), or a given man-made object such as a ship.

The operation portion 432 is an interface for the user to input various types of information or various types of instructions to the wireless terminal 40. As described above, the user can cause the display screen generation portion 424 to generate the floor information registration screen by operating the operation portion 432, and can input floor information, such as the floor name and the building/structure name, on the floor information registration screen.

When the OK button 56 is selected by the user on the floor information registration screen, the registration request portion 436 transmits the registration request information input onto the floor information registration screen, including the floor name, the name of the building or structure, and the signal intensity information, to the position estimation server 20 via the communication portion 416. FIG. 7A shows a specific example of the registration request information.

FIG. 7A is an explanatory diagram showing a specific example of the registration request information that is transmitted from the mobile terminal 40 at the position P1. As shown in FIG. 7A, the registration request portion 436 associates the signal intensity information (first measurement information) acquired by the measurement portion 420 at the position P1 with the floor information of "KK building" and "4th floor", and transmits the associated information to the position estimation server 20 as the registration request information. Note that the measurement portion 420 may use the selection of the OK button 56 by the user on the floor information registration screen as a trigger to perform signal intensity measurement.

FIG. 7B, FIG. 7C and FIG. 7D show specific examples of registration request information, similarly to FIG. 7A. More specifically, FIG. 7B is an explanatory diagram showing a specific example of registration request information that is transmitted from the mobile terminal 40 at a position P2. FIG. 7C is an explanatory diagram showing a specific example of registration request information that is transmitted from the mobile terminal 40 at a position P3. Further, FIG. 7D is an explanatory diagram showing a specific example of registration request information that is transmitted from the mobile terminal 40 at a position P4.

When referring to FIG. 7A to FIG. 7D, it can be confirmed that, even when wireless signals are transmitted from the same base station 30, signal intensities are different from each other depending on whether being on the same floor and on a distance from each position. Note that, in the above description, an example is described in which the registration request information includes signal intensity information as an example of measurement information. However, the present embodiment is not limited to this example. For example, instead of the signal intensity information, the registration request information may include distance information between the acquisition position of the signal intensity information and each of the base stations 30, the distance information being estimated from the signal intensity information by a method described later.

Here, FIG. 3 will be explained again. The communication portion 216 of the position estimation server 20 is an interface with the wireless terminal 40, and has a function as a transmitting portion and a receiving portion for transmitting and receiving various types of information to and from the wireless terminal 40. For example, the communication portion 216 receives from the wireless terminal 40 the registration request information shown in the group of FIG. 7.

The base station information management portion 220 performs management of base station information, such as registration of new base station information into the storage portion 224, and update, modification and deletion etc. of the base station information registered in the storage portion 224. It should be noted herein that the base station information is information that includes, for each of the base stations 30, a base station ID, position information (the latitude and longitude) indicating the position at which the base station is installed, signal intensity and floor information.

Note that, instead of signal intensity, the base station information may include a virtual distance between a signal intensity acquisition position and an installation position of the base station 30, the virtual distance being estimated from signal intensity. The virtual distance between the signal intensity acquisition position and the installation position of the base station 30 can be estimated by, for example, substituting signal intensity into Expression 1 below.

[Expression 1]

$$\text{Estimated distance} = 10^{((-A-rssi)/B)} \quad \text{(Expression 1)}$$

In Expression 1, A and B are constants, and rssi indicates signal intensity. For example, when A=32, B=25 and signal intensity=−80 dBm, the estimated virtual distance between the signal intensity acquisition position and the installation position of the base station 30 can be calculated to be 83 m. The signal intensity significantly depends on whether or not there is an obstacle, and the estimated distance calculated by the above Expression 1 does not necessarily coincide with an actual distance. However, the estimated distance calculated by the above Expression 1 serves as an index indicating a condition of a communication path between the signal intensity acquisition position and the installation position of the base station 30.

For example, it can be evaluated that, as the estimated distance calculated by the above Expression 1 is smaller, the communication path between the signal intensity acquisition position and the installation position of the base station 30 is in a better condition, and as the estimated distance calculated by the above Expression 1 is greater, the communication path between the signal intensity acquisition position and the installation position of the base station 30 is in a worse condition. Note that, for convenience of explanation, in the description below, it is assumed that the base station information includes, instead of signal intensity, the estimated distance that is calculated by the above Expression 1.

When the communication portion 216 receives registration request information from the wireless terminal 40, the base station information management portion 220 performs addition, update or the like of the base station information in the storage portion 224, based on the registration request information. For example, when the registration request information shown in the group of FIG. 7 is received from one or more wireless terminals 40, the base station information management portion 220 registers a set of base station information shown in FIG. 8 in the storage portion 224.

FIG. 8 is an explanatory diagram showing a specific example of the set of base station information that is registered in the storage portion 224. As shown in FIG. 8, the base station ID, the estimated distance and the floor information are associated with each other in each piece of base station information. For example, the base station information indicating the base station ID "30C", the estimated distance "83 m" and the floor information "5th floor" is base station information that is registered based on the registration request information at the position P2 shown in FIG. 7B. More specifically, this piece of base station information indicates that signal intensity measurement was performed at a position where the distance from the base station 30C was estimated to be 83 m, and that the measurement floor was "5th floor".

Note that, as shown in FIG. 4, in actuality, the base station 30C is installed on the 3rd floor. That is, in the present embodiment, the floor information registered as the base station information is not necessarily completely accurate. However, according to the present embodiment, even when inaccurate floor information is included, it is possible to appropriately estimate the floor on which the wireless terminal 40 exists, as will be described in "[2-3] Estimation of floor information".

On the other hand, a method is also conceivable in which each of the base stations 30 are visually confirmed, accurate floor information of each of the installed base stations 30 is registered in the position estimation server 20, and a current floor is estimated based on the registered floor information. However, it is troublesome to visually confirm each of the base stations 30. In addition, there is a case in which each of the base stations 30 is installed in a location that cannot be visually confirmed. In comparison to this, the position estimation system 1 according to the present embodiment is effective in that information necessary to estimate the current floor can be registered without visually confirming each of the base stations 30.

Note that the storage portion 224 that stores the base station information shown as an example in FIG. 8 may be a storage medium such as, for example, a non-volatile memory such as an electrically erasable programmable read-only memory (EEPROM), an erasable programmable read-only memory (EPROM), or the like, a magnetic disk such as a hard disk, a magnetic material disc, or the like, an optical disk such as a compact disc recordable (CD-R), a compact disc rewritable (CD-RW), a digital versatile disc recordable (DVD-R), a digital versatile disc rewritable (DVD-RW), a dual-layer digital versatile disc recordable (DVD+R), a dual-layer digital versatile disc rewritable (DVD+RW), a digital versatile disc random access memory (DVD-RAM), a Blu-ray™ disc recordable (BD-R), a Blu-ray™ disc rewritable (BD-RE), or the like, or a magneto-optical (MO) disk. Further, although the base station information includes the position information indicating the latitude and longitude of each of the base stations 30, a description of the position information is omitted in FIG. 8. Further, although the floor information can include not only the floor name but also the name of the building or structure, such as KK building, a description about the name of the building or structure is omitted below.

[2-3] Estimation of Floor Information

Next, with reference to FIG. 3 and FIG. 9 to FIG. 11, estimation of floor information in the position estimation system 1 according to the present embodiment will be described.

In order to estimate a current floor of the wireless terminal 40, the position estimation server 20 uses the signal intensity information in the wireless terminal 40, and the base station information registered in the storage portion 224 that is described in "[2-2] Registration of floor information".

For this reason, the information acquisition portion 440 of the wireless terminal 40 transmits, as a floor information estimation request, measurement information (second measurement information) acquired by signal intensity measurement in the measurement portion 420, to the position estimation server 20 via the communication portion 416. The information acquisition portion 440 may periodically transmit the measurement information of the floor information, or may transmit it based on a user operation on the operation portion 432. Hereinafter, processing when the information acquisition portion 440 of the wireless terminal 40 at a position P5 shown in FIG. 4 transmits the measurement information will be described as a specific example. Note that signal intensity information could be used as the measurement information. However, as shown in FIG. 9, the measurement information may be information in which the base station ID is associated with the distance between the measurement position and each of the base stations 30, the distance being estimated from the signal intensity information.

Figures 9, 10:
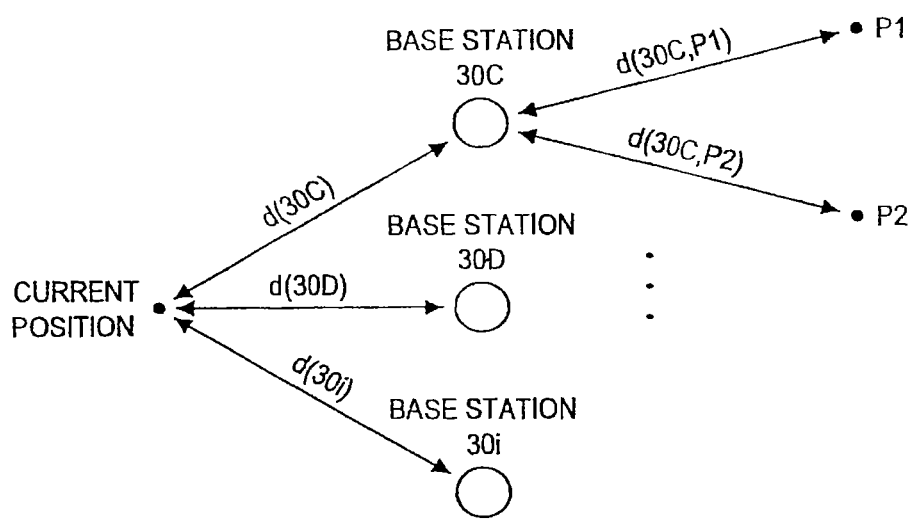
FIG. 9 is an explanatory diagram showing a specific example of measurement information that is transmitted from an information acquisition portion at a position P5.
FIG. 10 is an explanatory diagram showing a specific example of an evaluation method by a distance evaluation portion.

FIG. 9 is an explanatory diagram showing a specific example of measurement information that is transmitted from the information acquisition portion 440 at the position P5 shown in FIG. 4. As shown in FIG. 4, the position P5 is located on the 4th floor. Therefore, it may be considered that an estimated distance from the base station 30D installed on the same 4th floor is shortest. However, a case is also assumed in which an estimated distance from the base station 30E installed on the upper 5th floor is shorter than the estimated distance from the base station 30D installed on the same 4th floor, as shown in FIG. 9. This occurs when the degree of attenuation of the signal intensity of a wireless signal is low between the base station 30E and the position P5, due to a ceiling material, whether or not there is a stairwell, and the like, although the position P5 and the base station 30E are located on different floors.

Therefore, even if accurate floor information is registered in advance in each of the base stations 30 through complicated processing, when using a method that simply estimates floor information based on the base station 30 with the strongest signal intensity, it is predicted that floor information different from actual floor information is likely to be estimated. In comparison to this, with the position estimation server 20 according to the present embodiment, it is possible to estimate the current floor with high accuracy, even when the signal intensity of the base station 30 installed on a different floor from the measurement position is strongest and the estimated distance is shortest. Hereinafter, the position estimation server 20 that achieves such a function will be described in detail.

When the communication portion 216 receives measurement information as a floor information estimation request, the retrieval portion 232 of the position estimation server 20 extracts the base station ID included in the measurement information, and retrieves the base station information that is associated with the extracted base station ID from the storage portion 224.

The distance evaluation portion 234 evaluates a relationship between a current position and a registration position of the base station information, based on the measurement information received by the communication portion 216 and the base station information retrieved by the retrieval portion 232. A specific example of an evaluation method by the distance evaluation portion 234 will be described with reference to FIG. 10.

FIG. 10 is an explanatory diagram showing a specific example of the evaluation method by the distance evaluation portion 234. As shown in FIG. 10, an estimated distance (a second distance) between a current position and a base station 30$i$ ($i$ is a given capital alphabetic character) is expressed as d (30$i$), the estimated distance being included in the measurement information received by the communication portion 216. Further, an estimated distance (a first distance) between a registration position Pj (j is a given number) and the base station 30$i$ is expressed as d (30$i$, Pj), the estimated distance being included in the base station information retrieved by the retrieval portion 232. Note that, when the measurement information or the base station information includes signal intensity information instead of the estimated distance, the distance evaluation portion 234 may convert the signal intensity information to the estimated distance according to Expression 1. The distance evaluation portion 234 performs calculation of Expression 2 below that is represented using the above-described expressions.

[Expression 2]

$$D(30i, Pj) = d(30i) + d(30i, Pj) \quad \text{(Expression 2)}$$

Further, FIG. 11 shows specific examples of D(30$i$, Pj) that are obtained by the calculation shown by the above Expression 2.

FIG. 11 is an explanatory diagram showing specific examples of distance evaluation performed by the distance evaluation portion 234. As shown by Expression 2 and in FIG. 11, the distance evaluation portion 234 calculates D(30$i$, Pj) by adding d(30$i$) and d(30$i$, Pj) that relate to the same base station. For example, the distance evaluation portion 234 calculates a value of D(30C, P1) to be 55 in, by adding 30 m that is a value of d(30C) and 25 m that is a value of d(30C, P1).

It should be noted herein that, when a registration position Px and the current position are located on the same floor and a base station 30$y$ is installed on the floor, a value of D(30$y$, Px) becomes relatively small. This is because an estimated distance between the registration position Px and the base station 30$y$, and an estimated distance between the current position and the base station 30$y$ become smaller.

On the other hand, when a registration position Pv and the current position are located on different floors and a base station 30$w$ is installed on the same floor as either the registration position Pv or the current position, it is predicted that D(30$w$, Pv) is larger than D(30$y$, Px). This is because, since the base station 30$w$ is installed on a different floor from the registration position Pv or the current position, an estimated distance between the registration position Pv and the base station 30$w$, or an estimated distance between the current position and the base station 30$w$ becomes larger.

From this point of view, the floor estimation portion 236 has a function as a selection portion that selects D(30$i$min, Pjmin) that has the smallest value among D(30$i$, Pj) obtained by the distance evaluation portion 234. Then, the floor estimation portion 236 estimates that the floor information registered at Pjmin is the current floor information.

More specifically, the floor estimation portion 236 selects D(30D, P1) (29 m) that has the smallest value among D(30$i$, Pj) shown in FIG. 11. Then, the floor estimation portion 236 estimates that the current floor information is "4th floor" that is registered at the position P1. Here, the current position is the position P5 on the 4th floor. Therefore, it can be confirmed that, according to the present embodiment, the current floor information can be estimated with high accuracy.

Here, the configuration of the position estimation server 20 will be described again with reference to FIG. 3. When the communication portion 216 receives measurement information from the wireless terminal 40, the position information estimation portion 238 estimates the position information indicating the latitude and longitude of the wireless terminal 40. For example, the position estimation portion 238 uses the measurement information received by the communication portion 216 and the base station information registered in the storage portion 224 to estimate a current position O of the wireless terminal 40 in accordance with Expressions 3 to 5 described below.

[Expression 3]

$$O = \frac{1}{W} \cdot \sum_i (Wi \cdot Ai) \quad \text{(Expression 3)}$$

[Expression 4]

$$Wi = \frac{1}{d(30i)} \quad \text{(Expression 4)}$$

[Expression 5]

$$W = \sum_i Wi \quad \text{(Expression 5)}$$

In Expression 3, Ai indicates position information of an i-th base station registered in the storage portion 224. Therefore, when the position information is shown by the latitude and longitude, Expression 3 is applied separately to the latitude and longitude. Further, as shown in Expression 4, Wi is a weighting factor that is obtained based on the estimated distance d(30$i$) between the wireless terminal 40 and the base station 30$i$, which is estimated from signal intensity. Further, W is a sum of weighting factors as shown in Expression 5.

Referring to Expression 3, position information of the base station whose d(30$i$) is small is significantly reflected on the current position O of the wireless terminal 40. On the other hand, position information of the base station whose d(30$i$) is large has a small influence on the current position O of the wireless terminal 40. The position estimation portion 238 can rationally estimate the current position O of the wireless terminal 40 by using Expression 3 described above.

Note that a position estimation method of the wireless terminal 40 is not limited to the method that uses the above-described Expression 3. For example, the position of the base station that is a transmission source of a signal with the highest signal intensity among signals received by the wireless terminal 40 may be estimated as the position of the wireless terminal 40. Alternatively, a position that is the center of the base stations that are transmission sources of signals with a signal intensity equal to or more than a predetermined threshold value that are received by the wireless terminal 40 may be estimated as the position of the wireless terminal 40.

The floor information estimated by the floor estimation portion 236 in the above-described manner, and the position information estimated by the position estimation portion 238 are notified from the communication portion 216 to the wireless terminal 40. Then, for example, the display screen generation portion 424 of the wireless terminal 40 generates a display screen based on the floor information and the position information notified from the position estimation server 20. By doing this, it possible to supply information that corresponds to the floor information and the position information to the user of the wireless terminal 40.

Note that, when the measurement information received by the communication portion 216 includes a base station ID whose position information is unknown, the base station management portion 220 may register, as the position information of the base station ID, the current position O that is estimated from the measurement information by the position information estimation portion 238. In a similar manner, when the registration request information received by the communication portion 216 includes a base station ID whose position information is unknown, the base station management portion 220 may register, as the position information of the base station ID, the current position O that is estimated from the registration request information by the position information estimation portion 238. With the above-described configuration, it is possible to automatically enhance the position information of the base station 30 that is maintained in the position estimation server 20.

Modified Examples

In the above description, an example is explained in which the floor estimation portion 236 performs floor estimation based on the value of D(30$i$, Pj) obtained by the distance evaluation portion 234. However, the present invention is not limited to this example. For example, the distance evaluation portion 234 may calculate an average of sum values of an estimated distance included in the measurement information, and estimated distances which are associated with the same base station ID among the pieces of base station information retrieved by the retrieval portion 232 and which are also associated with the same floor information. Then, the floor estimation portion 236 may select floor information by extracting a minimum value from among D(30$i$, Pj) obtained by the distance evaluation portion 234, or from among average values.

For example, in FIG. 8, there are a plurality of estimated distances (10 m, 13 m) that are associated with the same base station ID "30D" and with the same floor information "4th floor". Here, if the estimated distance between the current position and the base station 30D that is obtained from the measurement information is 19 m, the distance evaluation portion 234 calculates an average value of 30.5 m that is represented by the expression ((10+19)+(13+19))/2.

When the above-described average value 30.5 m is the minimum value among D(30$i$, Pj) obtained by the distance evaluation portion 234, or among the average values, the floor estimation portion 236 selects the floor information "4th floor" that corresponds to the estimated distances (10 m, 13 m) used in the calculation of the average value.

With the above-described configuration, even if erroneous base station information is accidentally registered in the storage portion 224, it is possible to reduce the degree of adverse effects on floor estimation caused by the base station information, and to secure accuracy of floor estimation.

Further, the distance evaluation portion 234 may have a function as a priority processing portion that performs processing such that, as the number of pieces of the same floor information associated with the same base station ID becomes larger, the corresponding floor information is selected with priority by the floor estimation portion 236. For example, as the number of pieces of the same floor information associated with the same base station ID becomes larger, the distance evaluation portion 234 may treat, as d(30$i$, Pj), a distance that is shorter than the estimated distance associated with the corresponding floor information.

[3] Operation of Position Estimation System According to Present Embodiment

The functions of the position estimation system 1 according to the present embodiment are described above with reference to FIG. 3 to FIG. 11. Next, an operation of the position estimation system 1 according to the present embodiment will be described with reference to FIG. 12 and FIG. 13.

Figure 12:
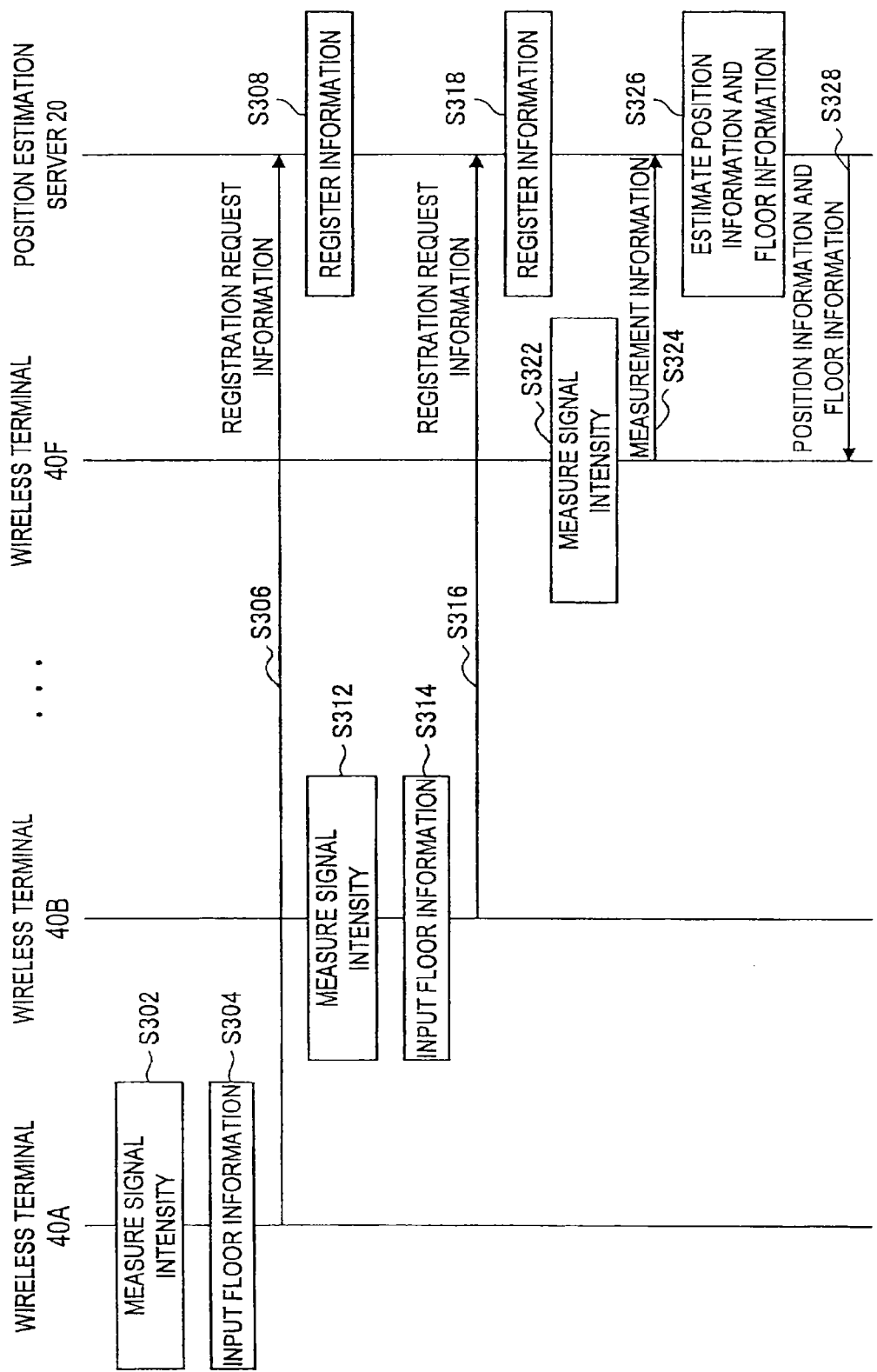
FIG. 12 is a sequence diagram showing an operation flow of the position estimation system according to the present embodiment.

FIG. 12 is a sequence diagram showing an operation flow of the position estimation system 1 according to the present embodiment. As shown in FIG. 12, first, the measurement portion 420 of a wireless terminal 40A performs signal intensity measurement on a certain floor of a building or structure (S302), and the user inputs a current floor on the floor information registration screen by operating the operation portion 432 (S304).

Following this, the registration request portion 436 of the wireless terminal 40A transmits, to the position estimation server 20, registration request information that includes measurement information, such as signal intensity information acquired by signal intensity measurement or estimated distance information, and floor information input by the user (S306). When the communication portion 216 receives the registration request information, the base station information management portion 220 of the position estimation server 40 associates the measurement information with the floor information included in the registration request information, and registers the associated information in the storage portion 224 as the base station information (S308).

In a similar manner, the measurement portion 420 of a wireless terminal 40B performs signal intensity measurement on a certain floor of the building or structure (S312), and a user inputs a current floor on the floor information registration screen by operating the operation portion 432 (S314).

Next, the registration request portion 436 of the wireless terminal 40B transmits, to the position estimation server 20, registration request information that includes measurement information, such as signal intensity information acquired by signal intensity measurement or estimated distance information, and floor information input by the user (S316). When the communication portion 216 receives the registration request information, the base station information management portion 220 of the position estimation server 40 associates the measurement information with the floor information included in the registration request information, and registers the associated information in the storage portion 224 as the base station information (S318). In this manner, the base station information including the floor information is accumulated in the storage portion 224 of the position estimation server 20.

After that, the measurement portion 420 of a wireless terminal 40F performs signal intensity measurement of the wireless signal transmitted from the surrounding base station 30 (S322), and the information acquisition portion 440 transmits the measurement information acquired by the signal intensity measurement to the position estimation server 20 (S324). When the communication portion 216 receives the measurement information, the position estimation server 20 estimates position information and floor information of the wireless terminal 40F, based on the measurement information and the base station information registered in the storage portion 224 (S326), and transmits them to the wireless terminal 40F (S328).

Figure 13:
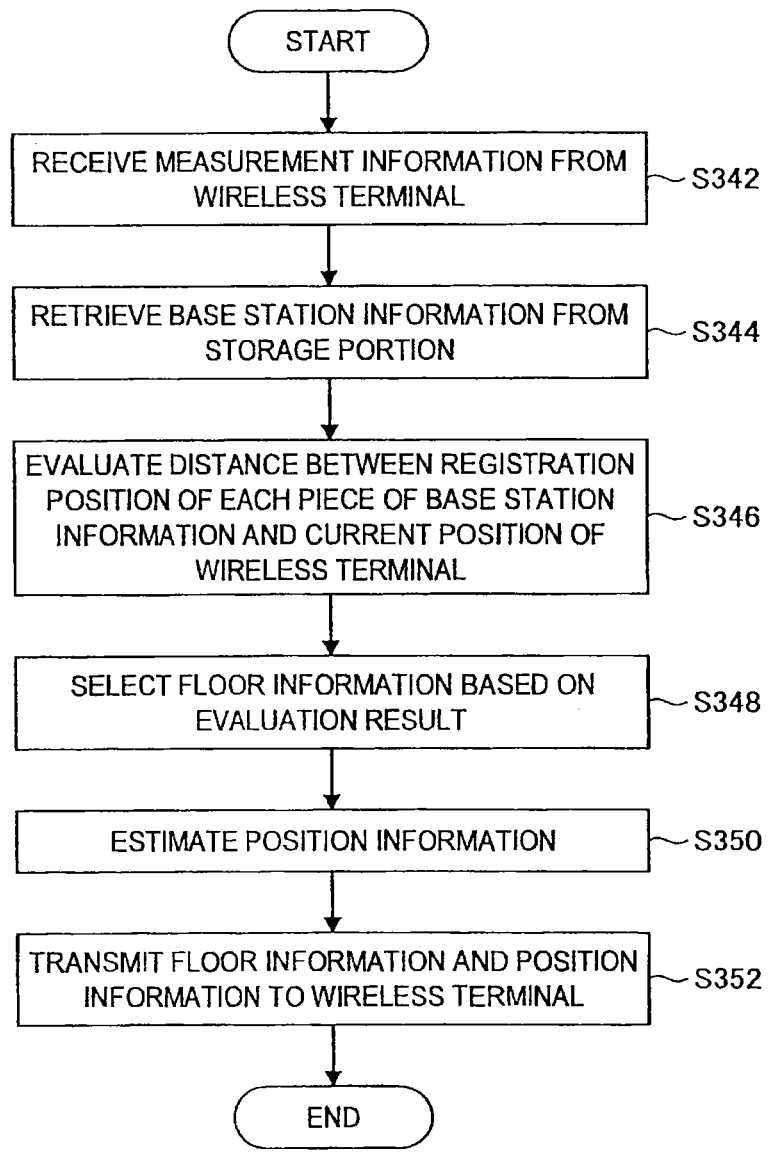
FIG. 13 is a flow chart showing a detailed flow of estimation processing that is performed by the position estimation server.

FIG. 13 is a flow chart showing a detailed flow of estimation processing that is performed by the position estimation server 20. As shown in FIG. 13, first, when the communication portion 216 receives measurement information from the wireless terminal 40 (S342), the retrieval portion 232 retrieves base station information including the base station ID that is contained in the measurement information, from the storage portion 224 (S344).

After that, the distance evaluation portion 234 evaluates the distance between the registration position of the base station information that is retrieved by the retrieval portion 232 and the current wireless terminal 40 by calculation, using the method described in "[2-3] Estimation of floor information", for example (S346). More specifically, the distance evaluation portion 234 calculates D(30$i$, Pj) in accordance with Expression 2. Then, the floor estimation portion 236 selects floor information based on an evaluation result by the distance evaluation portion 234 (S348).

Further, the distance estimation portion 238 estimates the position information indicating the latitude and longitude of the wireless terminal 40 in accordance with, for example, Expression 3, using the measurement information received by the communication portion 216 and the base station information registered in the storage portion 224. Then, the communication portion 216 transmits, to the portable terminal 40, the floor information estimated by the floor estimation portion 236 and the position information estimated by the position information estimation portion 238 (S352).

[4] Conclusion

As described above, according to the present embodiment, the position estimation server 20 can accurately estimate the floor of the wireless terminal 40, based on the measurement information acquired by signal intensity measurement in the wireless terminal 40 and the base station information registered in the storage portion 224 of the position estimation server 20. It should be noted herein that the base station information registered in the storage portion 224 is information in which the floor information indicating the floor where signal intensity measurement has been performed in advance by a given wireless terminal 40 is associated with the measurement information that was acquired by the signal intensity measurement. Therefore, the present embodiment is especially effective in that the floor of the wireless terminal 40 can be accurately estimated in addition to the position information, while eliminating the troublesome operation of visually confirming each of the base stations 30 in advance and registering the base station information of each of the base stations 30. Moreover, the present embodiment is also advantageous in that there is no need to provide the wireless terminal 40 with a special sensor for floor estimation.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

For example, in the above-described embodiment, an example is described in which a plurality of estimated positions that are associated with the same base station ID and the same floor information can exist in the storage portion 224. However, the present invention is not limited to this example. As another embodiment, the base station information management portion 220 may cause a certain base station ID and certain floor information to be associated only with the shortest estimated distance. In the example shown in FIG. 8, the base station management portion 220 may delete the information of the base station ID "30C", the floor information "4th floor", and the estimated distance "28 m", for example. Alternatively, when the information of the base station ID "30C", the floor information "4th floor", and the estimated distance "25 m" has already been registered, the base station information management portion 220 may not register the information of the base station ID "30C", the floor information "4th floor", and the estimated distance "28 m"

Further, in the above-described embodiment, an example is described in which the floor information is estimated by converting the signal intensity information to an estimated distance in accordance with Expression 1. However, the present invention is not limited to this example. In other words, the present invention can be achieved using a parameter of a given dimension that is acquired by signal intensity measurement.

Furthermore, each step of the processing performed by the position estimation system 1 or the position estimation server 20 in this specification does not have to be performed in time series in line with the order detailed in the sequence diagram or the flow chart. For example, each step of the processing performed by the position estimation system 1 or the position estimation server 20 may include processing that is performed in parallel or individually (for example, parallel processing or object oriented processing).

Note that, a computer program can also be created that causes hardware such as the CPU 201, the ROM, 202 and the RAM 203 that are built-in to the position estimation server 20 and the portable terminal 40 to perform functions that are the same as each structural element of the above-described position estimation server 20 and the portable terminal 40. Further, a storage medium that stores the computer program is also provided. Moreover, if each function block shown by the functional block diagram in FIG. 3 is structured by hardware, a series of processes can be realized by hardware.

The invention claimed is:

1. A non-transitory computer-readable medium having executable instructions stored thereon, the executable instructions being executable by a computer to perform a method comprising:
   receiving a wireless signal transmitted from a base station, the wireless signal including base station identification information;
   receiving internal location information for a building, the internal location information indicating a location within the building;
   accessing signal intensity information of the wireless signal received from the base station in response to acceptance of a predetermined user input operation after receiving the internal location information for the building; and
   transmitting the signal intensity information, the base station identification information, and the internal location information, wherein
   the signal intensity information is associated with the base station identification information and the internal location information in connection with a request for an estimated position for the location within the building, and
   the signal intensity information is transmitted after the acceptance of the predetermined user input operation.

2. The non-transitory computer-readable medium of claim 1, wherein
   the step of receiving includes receiving building identification information, the building identification information identifying the building,
   the step of transmitting includes transmitting the building identification information, and
   the signal intensity information is further associated with the building identification information in connection with the request for the estimated position for the location within the building.

3. The non-transitory computer-readable medium of claim 2, wherein the method further comprises:
generating one or more display screens;
collecting input from a user, the collection of input including causing the generating the one or more display screens, wherein
the step of transmitting includes transmitting the signal intensity information, the base station identification information, the building identification information, and the internal location information to a position estimation server; and
the computer further includes a display configured to display the one or more display screens generated by the step of generating.

4. The non-transitory computer-readable medium of claim 3, wherein the one or more display screens includes an internal location information registration screen for registering information including the internal location information with the position estimation server, and a guidance screen.

5. The non-transitory computer-readable medium of claim 4, wherein the internal location information registration screen includes an interface for inputting the building identification information associated with the computer's location.

6. The non-transitory computer-readable medium of claim 5, wherein the internal location information registration screen includes an interface for inputting the internal location associated with the computer's location, the internal location being a floor or a room.

7. The non-transitory computer-readable medium of claim 3, wherein the display comprises at least one of: a Cathode Ray Tube (CRT) display device, a Liquid Crystal Display (LCD) device, an Organic Light Emitting Display (OLED) device, and a lamp.

8. The non-transitory computer-readable medium of claim 3, wherein the method further comprises:
periodically transmitting the signal intensity information, or transmitting the signal intensity information based on a predetermined user operation.

9. The non-transitory computer-readable medium of claim 1, wherein the computer includes one or more of:
a wireless communication function defined by the Institute of Electrical and Electronic Engineers (IEEE);
a Multiple Input Multiple Output (MIMO) communication function defined by IEEE; and
a communication function associated with Worldwide Interoperability for Microwave Access (WiMAX).

10. The non-transitory computer-readable medium of claim 1, further comprising:
communicating information including at least one of: electronic mail, audio data, visual data, and program code.

11. The non-transitory computer-readable medium of claim 1, wherein the computer is one of: a mobile phone, a personal computer, a home video processing device, a personal handyphone system, a mobile music playback device, a mobile video processing device, a personal digital assistant, a home game console, a mobile game console, and a household electrical appliance.

12. The non-transitory computer-readable medium of claim 1, wherein the internal location information indicates the location of a venue within the building.

13. A method for transmitting information, the method comprising:

receiving, by circuitry of a wireless terminal, a wireless signal transmitted from a base station, the wireless signal including base station identification information;
receiving, by the circuitry, internal location information for a building, the internal location information indicating a location within the building;
accessing, by the circuitry, signal intensity information of the wireless signal received from the base station in response to acceptance of a predetermined user input operation after receiving the internal location information for the building; and
transmitting, by the circuitry, the signal intensity information, the base station identification information, and the internal location information, wherein
the signal intensity information is associated with the base station identification information and the internal location information in connection with a request for an estimated position for the location within the building, and
the signal intensity information is transmitted after the acceptance of the predetermined user input operation.

14. The method of claim 13, wherein
the step of receiving includes receiving building identification information, the building identification information identifying the building,
the step of transmitting includes transmitting the building identification information, and
the signal intensity information is further associated with the building identification information in connection with the request for the estimated position for the location within the building.

15. The method of claim 13, wherein
the internal location information indicates the location of a venue within the building.

16. A wireless terminal, comprising:
circuitry configured to
receive a wireless signal transmitted from a base station, the wireless signal including base station identification information;
receive internal location information for a building, the internal location information indicating a location within the building;
access signal intensity information of the wireless signal received from the base station in response to acceptance of a predetermined user input operation after the internal location information for the building is received; and
transmit the signal intensity information, the base station identification information, and the internal location information, wherein
the signal intensity information is associated with the base station identification information and the internal location information in connection with a request for an estimated position for the location within the building, and
the signal intensity information is transmitted after the acceptance of the predetermined user input operation.

17. The wireless terminal of claim 16, wherein
the circuitry is further configured to
receive building identification information, the building identification information identifying the building, and
transmit the building identification information, and
the signal intensity information is further associated with the building identification information in connection with the request for the estimated position for the location within the building.

18. The wireless terminal of claim 16, wherein the internal location information indicates the location of a venue within the building.

\* \* \* \* \*